(12) United States Patent
Pocha et al.

(10) Patent No.: US 12,250,597 B2
(45) Date of Patent: *Mar. 11, 2025

(54) SYSTEMS AND METHODS TO OPTIMIZE NON-3GPP UNTRUSTED WI-FI TO NEW RADIO EVOLVED PACKET SYSTEM FALLBACK HANDOVER

(71) Applicant: Cisco Technology, Inc., San Jose, CA (US)

(72) Inventors: Raghunadha Reddy Pocha, Bengaluru (IN); Mantha Ravi Shankar, Bangalore (IN); Jis Abraham, Bangalore (IN); Sandeep Dasgupta, Bangalore (IN); Mukesh Yadav, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/518,145

(22) Filed: Nov. 22, 2023

(65) Prior Publication Data

US 2024/0098580 A1     Mar. 21, 2024

Related U.S. Application Data

(63) Continuation of application No. 17/377,716, filed on Jul. 16, 2021, now Pat. No. 11,843,978.

(51) Int. Cl.
| | |
|---|---|
| H04W 36/00 | (2009.01) |
| H04W 36/22 | (2009.01) |
| H04W 36/32 | (2009.01) |

(52) U.S. Cl.
CPC ... *H04W 36/0022* (2013.01); *H04W 36/0061* (2013.01); *H04W 36/22* (2013.01); *H04W 36/322* (2023.05)

(58) Field of Classification Search
CPC .............. H04M 15/00; H04M 17/00; H04M 2215/2026; H04M 2215/32; H04W 4/24
See application file for complete search history.

(56) References Cited

U.S. PATENT DOCUMENTS

| | | |
|---|---|---|
| 2015/0282029 A1 | 10/2015 | Faccin et al. |
| 2019/0394684 A1 | 12/2019 | Li et al. |

(Continued)

FOREIGN PATENT DOCUMENTS

| | | |
|---|---|---|
| EP | 4021073 A1 | 6/2022 |
| WO | 2020160177 A1 | 8/2020 |

OTHER PUBLICATIONS

3GPP: "3rd Generation Partnership Project; Technical Specification Group Services and System Aspects; Procedures for the 5G System (5GS); Stage 2 (Release 16)," 3GPP TS 23.502 V16.4.0, Mar. 25, 2020, XP051887243, 582 Pages.

(Continued)

*Primary Examiner* — Charles N Appiah
*Assistant Examiner* — Frank E Donado
(74) *Attorney, Agent, or Firm* — Polsinelli P.C.

(57) ABSTRACT

The present technology is generally directed to optimizing a non-3GPP untrusted Wi-Fi to 5G system handover followed by Evolved Packet System (EPS) fallback, more specifically, to delaying removal of the Wi-Fi session resources and creating a voice flow as part of the EPS fallback. The present technology can receive a request for an EPS fallback from a mobile device for a handover to a 5G network while the mobile device is in communication over non-3GPP access network, maintain one or more resources of the non-3GPP access network during data path switching from the non-3GPP access network to the 5G network, generate a list of EPS bearer identifiers to transmit to an access and mobility management function (AMF), wherein the list of EPS bearer identifiers is associated with a voice flow to transfer the one (Continued)

or more resources of the non-3GPP access network as part of the handover from the non-3GPP access network to the 5G network, and transmit the list of EPS bearer identifiers to a mobility management entity (MME).

20 Claims, 13 Drawing Sheets

(56) References Cited

U.S. PATENT DOCUMENTS

| | | | |
|---|---|---|---|
| 2020/0045592 A1* | 2/2020 | Wu | H04W 36/0055 |
| 2020/0092760 A1* | 3/2020 | Xu | H04W 76/34 |
| 2020/0120561 A1 | 4/2020 | Huang-Fu et al. | |
| 2020/0196169 A1* | 6/2020 | Dao | H04W 72/535 |
| 2020/0275331 A1 | 8/2020 | Kim et al. | |
| 2020/0275511 A1 | 8/2020 | Liu et al. | |
| 2020/0305211 A1* | 9/2020 | Foti | H04W 12/08 |
| 2021/0022024 A1 | 1/2021 | Yao et al. | |
| 2021/0045021 A1* | 2/2021 | Jeong | H04W 36/0033 |
| 2021/0136645 A1* | 5/2021 | Zhao | H04M 7/006 |
| 2021/0289402 A1 | 9/2021 | Ke et al. | |
| 2022/0116829 A1* | 4/2022 | Singh | H04W 36/0022 |
| 2022/0191747 A1* | 6/2022 | Ignjatovic | H04M 15/57 |
| 2022/0345949 A1 | 10/2022 | Youn et al. | |
| 2023/0319514 A1* | 10/2023 | Kim | H04W 4/08 |
| | | | 370/312 |

OTHER PUBLICATIONS

International Search Report and Written Opinion for International Application No. PCT/US2022/036366, mailed Nov. 17, 2022, 13 Pages.

LG Electronics: "Discussion on EPS/RAT Fallback for IMS Voice Over ePDG/N3WIF," S2-1909620, 3GPP TSG-SA2 Meeting #135, 3rd Generation Partnership Project (3GPP), Mobile Competence Centre, 650, Route Des Lucioles, F-06921 Sophia-antipolis Cedex, France, vol. SA WG2, No. Split, Croatia, Oct. 14, 2019-Oct. 18, 2019, Oct. 4, 2019, XP051795715, pp. 1-4.

ZTE: "Clarification on the EPS Fallback Reporting During Transfer of PDU Session used For IMS Voice from non-3GPP Access to 5GS", SP-200079, S2-2002006, 3rd Generation Partnership Project (3GPP), Mobile Competence Centre, 650, Route Des Lucioles, F-06921 Sophia-antipolis Cedex, France, vol. SA WG2, No. Elbonia, Feb. 24, 2020-Feb. 27, 2020, Mar. 9, 2020, XP051862527.

* cited by examiner

SYSTEMS AND METHODS TO OPTIMIZE NON-3GPP UNTRUSTED WI-FI TO NEW RADIO EVOLVED PACKET SYSTEM FALLBACK HANDOVER

CROSS-REFERENCE TO RELATED APPLICATION

This application is a Continuation of U.S. Non-Provisional patent application Ser. No. 17/377,716 filed on Jul. 16, 2021, entitled "SYSTEMS AND METHODS TO OPTIMIZE NON-3GPP UNTRUSTED WI-FI TO NEW RADIO EVOLVED PACKET SYSTEM FALLBACK HANDOVER" the entire contents of which are hereby expressly incorporated by reference in their entirety.

DESCRIPTION OF THE RELATED TECHNOLOGY

The subject matter of this disclosure relates in general to the field of computer networking, and more particularly, to systems and methods for optimizing a non-3GPP untrusted Wi-Fi to 5G system handover followed by Evolved Packet System (EPS) fallback.

BACKGROUND

According to an EPS fallback procedure as published by 3GPP, client devices can use the 5G system with new radio (NR) before all resources (e.g., voice features) are implemented in the client devices and in NG-RAN via the EPS fallback procedure. When user equipment (UE) moves from Wi-Fi to NR followed by EPS fallback, in an attempt to establish a bearer for a voice flow over NR during the initial call setup, the NG-RAN initiates transfer of all sessions from the 5G system to EPS. However, the EPS fallback procedure adds significant call setup time, increases latency, and causes glitches for ongoing voice traffic.

DETAILED DESCRIPTION

Figure 1A:
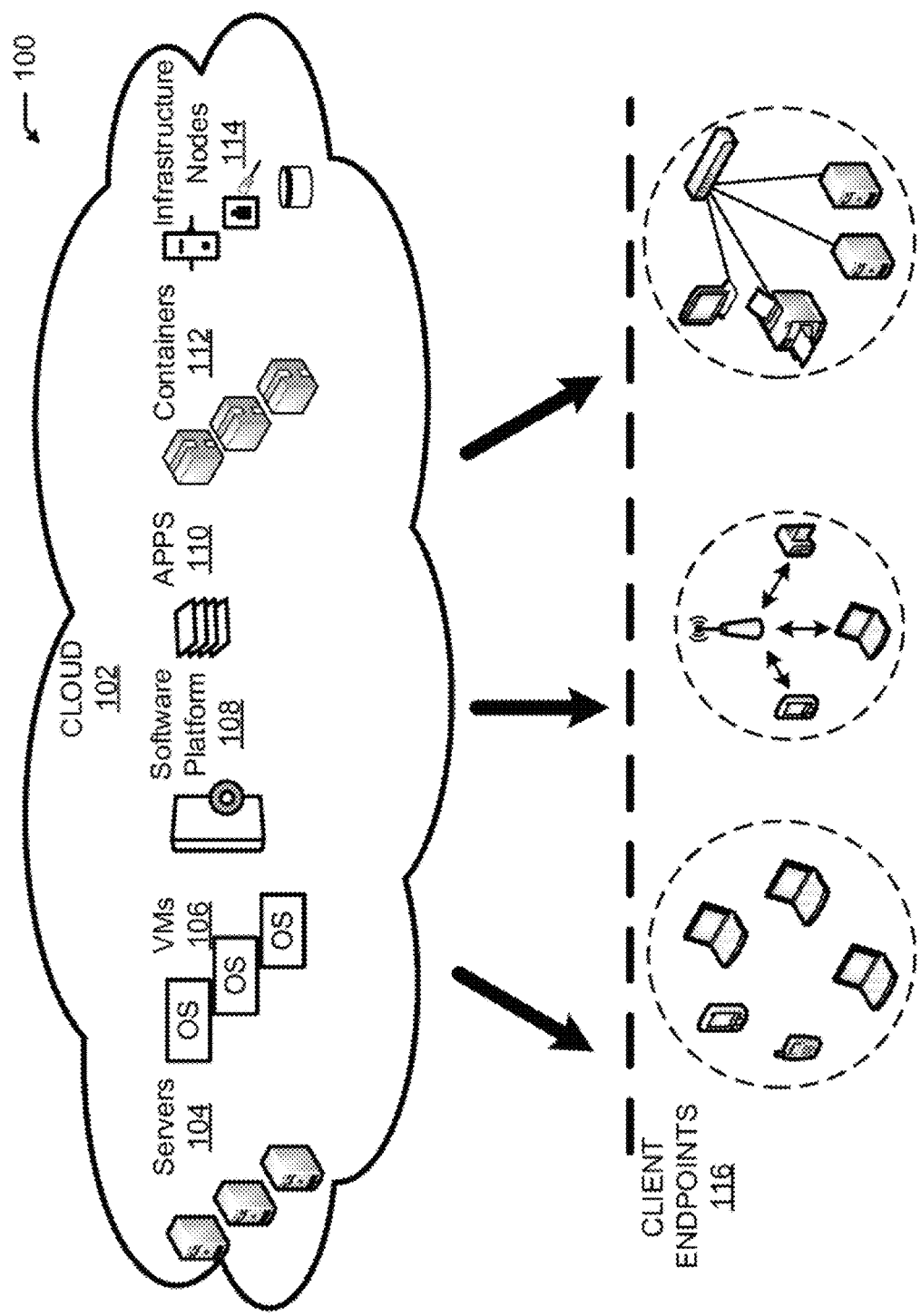
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The following acronyms are used throughout the present disclosure, provided below for convenience.
AMF: Access and Mobility Management Function
CHF: Charging Function
DL: Downlink
EBI EPS Bearer ID
EPC: 4G Evolved Packet Core
ePDG: Evolved Packet Data Gateway
IMS: IP Multimedia Subsystem
IWF: Interworking Function
MME: Mobility Management Entity
NAS: Non Access Stratum
NR: New Radio
PCF: Policy Control Function
PDN: Packet Data Network
PDU: Protocol Data Unit
PGW: Packet Data Gateways
RAT: Radio Access Technology
SGW: Serving Gateway
SMF: Session Management Function
UDP: User Datagram Protocol
UL: Uplink
UPF: User Plane Function
UTRAN: UMTS Terrestrial Radio Access Network According to an EPS fallback procedure as published by 3GPP, client devices can use the 5G system with NR before all resources (e.g., voice features) are implemented in the client devices and in NG-RAN via the EPS fallback procedure. When a UE moves from Wi-Fi to NR followed by EPS fallback, in an attempt to establish a bearer for a voice flow over NR during the initial call setup, the NG-RAN initiates transfer of all sessions from the 5G system to EPS. However, the EPS fallback procedure adds significant call setup time, increases latency, and causes glitches for ongoing voice traffic. As such, there is a need to optimize a non-3GPP untrusted Wi-Fi to 5GS handover followed by EPS fallback to minimize signaling and intervention for traffic loss and reduce latency and glitches in voice traffic.

The present technology includes systems, methods, and computer-readable media for solving these problems and discrepancies. Specifically, systems, methods, and computer-readable media for optimizing a non-3GPP untrusted Wi-Fi to 5G system handover followed by EPS fallback.

Overview

Methods, systems, and non-transitory computer-readable media are provided for optimizing a non-3GPP untrusted Wi-Fi to 5G system handover followed by EPS fallback.

The present disclosure includes systems, methods, and computer-readable mediums for delaying removal of the Wi-Fi session resources and creating a voice flow as part of the EPS fallback to minimize latency and glitch. More specifically, the present disclosure includes systems, methods, and computer-readable mediums for maintaining one or more resources of the non-3GPP access network during data path switching from the non-3GPP access network to the 5G network, generating a list of EPS bearer identifiers to transmit to an AMF, and transmitting the list of EPS bearer identifiers to an MME. This way two N4 interactions with UPF and one SGW/MME interaction can be skipped. It can also provide a better user experience since a voice bearer is available on a 4G before the Wi-Fi session is released.

The present technology can receive a request for an EPS fallback from a mobile device for a handover to a 5G network, wherein the mobile device is in communication over non-3GPP access network; maintain one or more resources of the non-3GPP access network during data path switching from the non-3GPP access network to the 5G network; generate a list of EPS bearer identifiers to transmit to an AMF, wherein the list of EPS bearer identifiers is associated with a voice flow to transfer the one or more resources of the non-3GPP access network as part of the handover from the non-3GPP access network to the 5G network; and transmit the list of EPS bearer identifiers to an MME. The list of EPS bearer identifiers can be transmitted to the MME as part of a forward relocation request.

Furthermore, the present technology can maintain a voice flow through a default bearer and a dedicated bearer of the non-3GPP access network for uplink and downlink traffic until a modify bearer request is processed. Also, the present technology can process a modify bearer request based on the list of EPS bearer identifiers.

The present technology can further continue the communication over the non-3GPP access network until a modify bearer request is processed. The present technology can also remove the one or more resources of the non-3GPP access network subsequent to processing of a modify bearer request; establish a downlink channel for a 4G access network; and transmit a request for an N4 session modification to a UPF.

In addition, the present technology can send a charging update request to a charging function, the charging update request including a PDU session information with one or more access parameters associated with a 4G access network and a multi-usage report containing details on one or more access parameters associated with the non-3GPP access network.

A system for optimizing a non-3GPP untrusted Wi-Fi to 5G system handover followed by EPS fallback can include one or more processors and at least one computer-readable storage medium storing instructions which, when executed by the one or more processors, cause the one or more processors to receive a request for an EPS fallback from a mobile device for a handover to a 5G network, wherein the mobile device is in communication over non-3GPP access network; maintain one or more resources of the non-3GPP access network during data path switching from the non-3GPP access network to the 5G network; generate a list of EPS bearer identifiers to transmit to an AMF, wherein the list of EPS bearer identifiers is associated with a voice flow to transfer the one or more resources of the non-3GPP access network as part of the handover from the non-3GPP access network to the 5G network; and transmit the list of EPS bearer identifiers to an MME.

A non-transitory computer-readable storage medium having stored therein instructions which, when executed by one or more processors, can cause the one or more processors to receive a request for an EPS fallback from a mobile device for a handover to a 5G network, wherein the mobile device is in communication over non-3GPP access network; maintain one or more resources of the non-3GPP access network during data path switching from the non-3GPP access network to the 5G network; generate a list of EPS bearer identifiers to transmit to an AMF, wherein the list of EPS bearer identifiers is associated with a voice flow to transfer the one or more resources of the non-3GPP access network as part of the handover from the non-3GPP access network to the 5G network; and transmit the list of EPS bearer identifiers to an MME.

Description

The disclosed technology addresses the need in the art for optimizing a non-3GPP untrusted Wi-Fi to 5G system handover followed by EPS fallback.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

The client endpoints 116 can communicate with the elements 104-114 as part of accessing network services through infrastructure intermediation messaging. Specifically, communications between the elements 104-114 and the client endpoints 116 can be managed and otherwise controlled through a network infrastructure between the client endpoints 116 and the cloud 102. For example, any of a 5G infrastructure, an LTE infrastructure and a Wi-Fi infrastructure can communicate a physical location of a client endpoint to a cloud service. In turn, the cloud service can cause the infrastructure to send specific signaling to the client endpoint for accessing network services through the cloud service. For example, the cloud service can use the LTE infrastructure, e.g. through an LTE S14 interface, to alert the client endpoint of Wi-Fi availability through the Wi-Fi infrastructure. In another example, the cloud service can use the Wi-Fi infrastructure, e.g. through MBO Wi-Fi messaging, to alert the client endpoint of LTE availability through the LTE infrastructure.

Figure 1B:
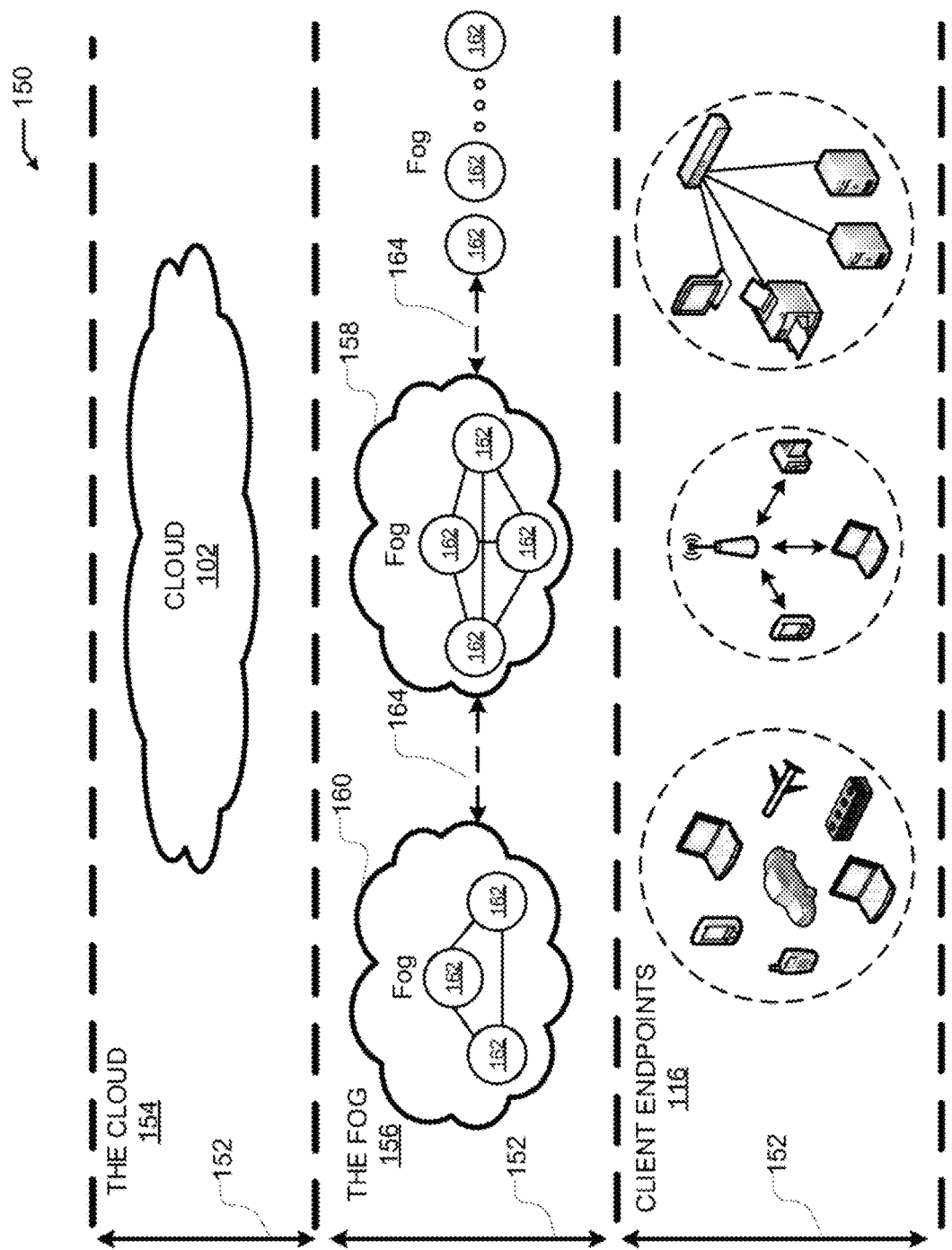
FIG. 1B illustrates an example fog computing architecture.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2:
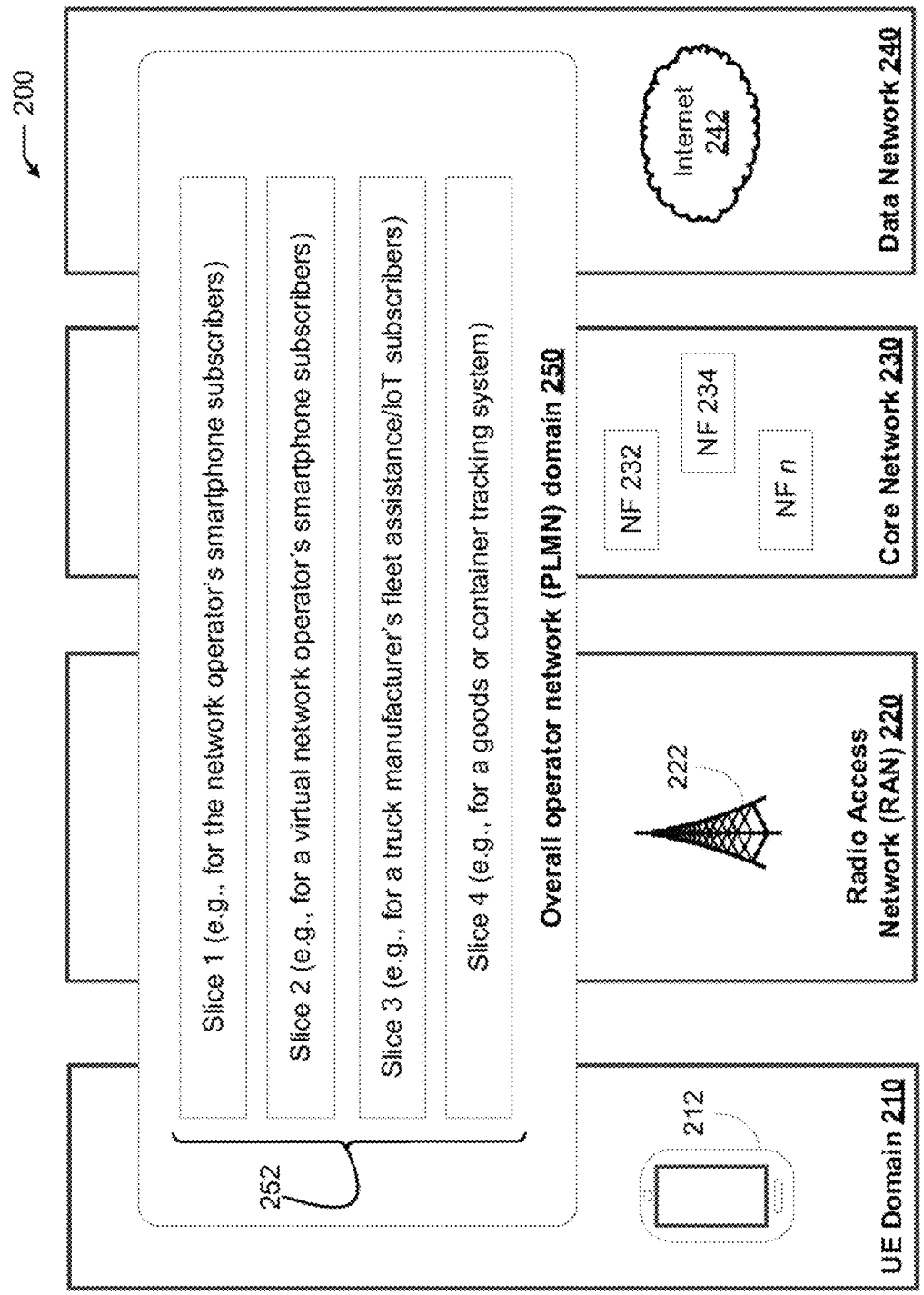
FIG. 2 depicts an exemplary schematic representation of a 5G network environment in which network slicing has been implemented, and in which one or more aspects of the present disclosure may operate.

FIG. 2 depicts an exemplary schematic representation of a 5G network environment 200 in which network slicing has been implemented, and in which one or more aspects of the present disclosure may operate. As illustrated, network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, ..., n reside; and a Data Network 240, in which one or more data communication networks such as the Internet 242 reside. Additionally, the Data Network 240 can support SaaS providers configured to provide SaaSs to enterprises, e.g. to users in the UE domain 210.

Core Network 230 contains a plurality of Network Functions (NFs), shown here as NF 232, NF 234 ... NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically executes in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN), and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the RAN 120, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Figure 3:
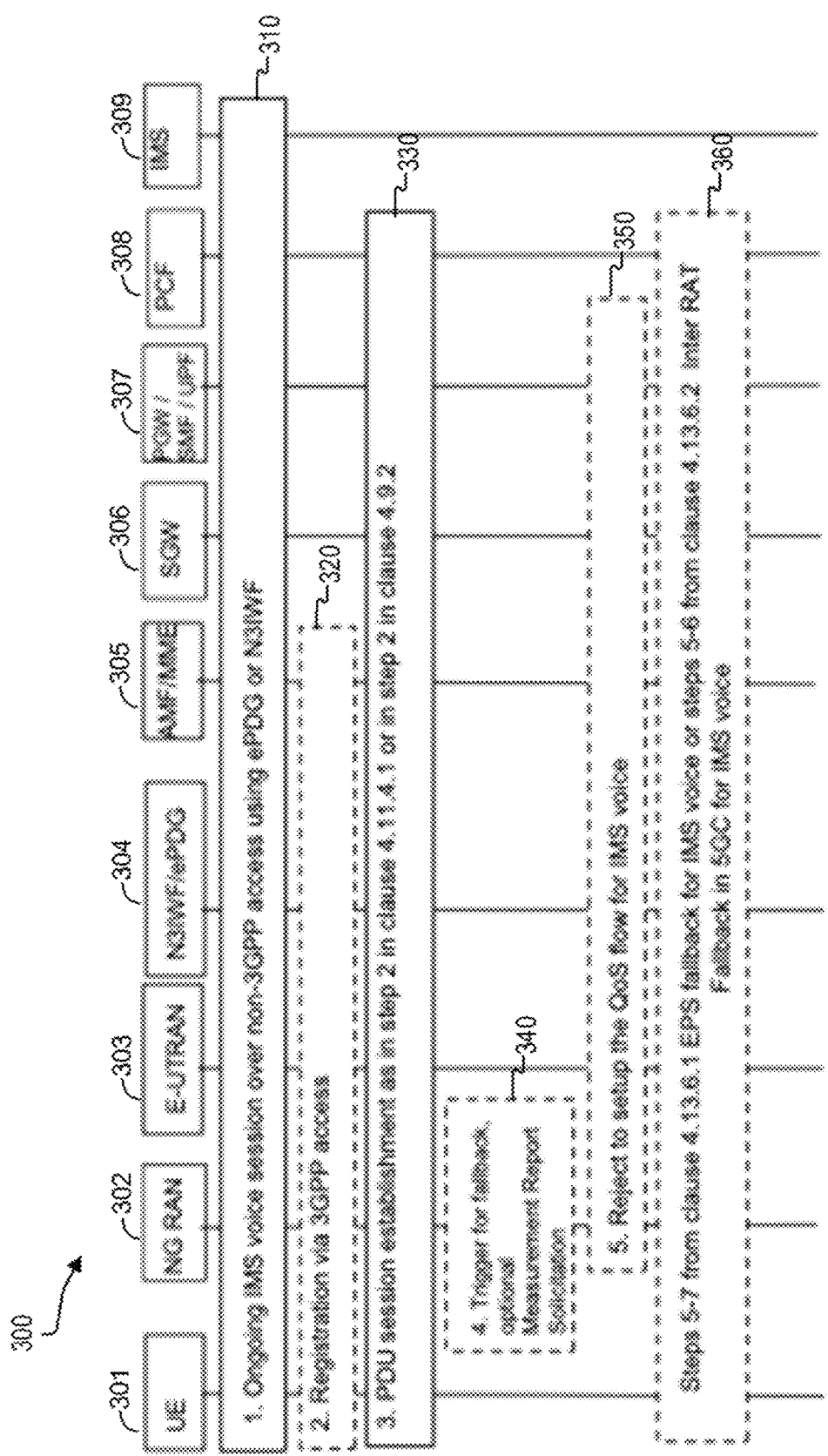
FIG. 3 illustrates an example communication diagram for a conventional handover procedure of Wi-Fi to NR followed by EPS fallback.

FIG. 3 illustrates an example communication diagram for a conventional handover procedure 300 of non-3GPP (e.g., Wi-Fi) access to NR followed by EPS fallback as defined in 3GPP 23.502 CR1941. At step 310, UE 301 has an ongoing IMS 309 voice session via non-3GPP access using N3IWF or ePDG 304. If UE 301 is not registered via 3GPP access, UE 301 initiates the registration procedure at step 320. At step 330, UE 310 initiates PDU session establishment for the PDU session used for IMS 309 voice service. SMF accepts the successful PDU session transfer to UE 301 in NAS. If NG-RAN 302 decides to trigger EPS or inter-RAT fallback, AMF sends an indication that "redirection for EPS fallback for voice is possible" at step 340. At step 350, NG-RAN 302 responds with rejection to set up the QoS flow for IMS 309 voice towards PGW-C+SMF 307 via AMF 305 with an indication that mobility due to fallback for IMS voice is ongoing. PGW-C+SMF 307 executes the release of resources in a non-3GPP (e.g., Wi-Fi) access network. At step 360, EPS fallback for IMS voice or inter-RAT fallback in 5GC for IMS voice is triggered.

In the conventional handover procedure 300, UE cannot send uplink (UL) traffic to default-session flow over NR since the EPS fallback (step 360) is already triggered. UE will have to send UL traffic over Wi-Fi RAT for voice flows until UE completes EPS fallback to install filters and EPS bearers towards LTE to avoid the minimal intervention for traffic loss and have better latency. Furthermore, as SMF retains only the session flows (5QI=5) in NR, voice flows (5Q=1) are not considered in NR and have to wait for the EPS fallback trigger to happen from AMF (step 350). For at least the foregoing reasons, the handover procedure 300 of Wi-Fi to NR followed by EPS fallback as defined in 3GPP 23.50 CR1941 causes latency issues and glitches in ongoing voice traffic for end-user.

The present disclosure is directed to retaining the Wi-Fi session at SMF side when Wi-Fi to NR followed by EPS fallback, followed by transferring the voice flows to EPS with minimal signaling for better latency and apart from having minimal impact on charging usage report for a user when multiple RATs are involved in handover. Details of the handover procedure in accordance with the present disclosure are described as follows.

Figure 4:
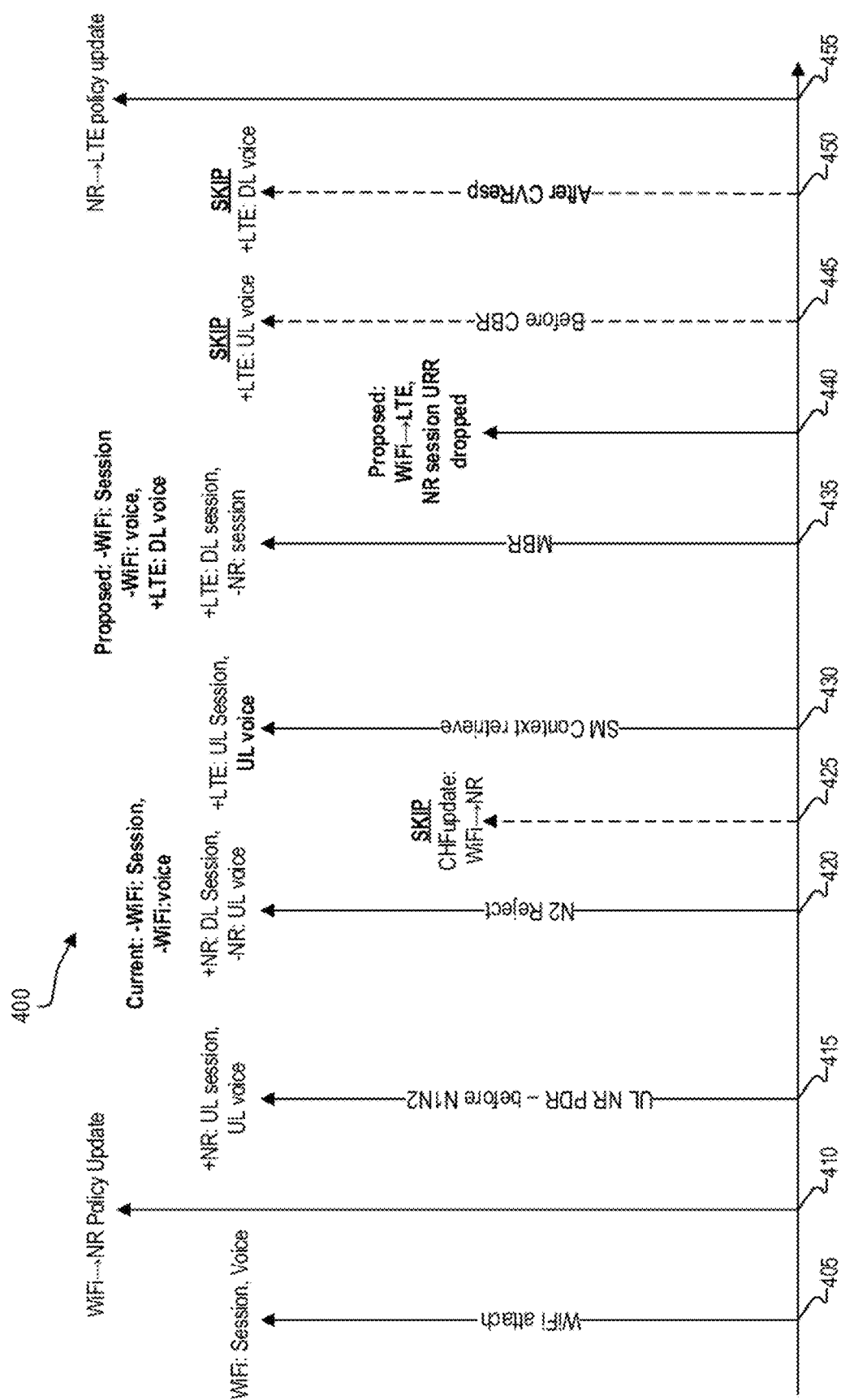
FIG. 4 illustrates an example sequential diagram for Wi-Fi to NR followed by EPS fallback handover procedure according to one or more examples of the present disclosure.

FIG. 4 illustrates an example sequence diagram for a handover procedure 400 of Wi-Fi to NR followed by EPS fallback according to one or more examples of the present disclosure. At step 405, UE is in communication over Wi-Fi (i.e., having both session and voice flows over non-3GPP access (e.g., Wi-Fi)). At step 410, UE moves to 3GPP access (e.g., NR) and camps in NG-RAN, which results in a policy update from Wi-Fi to NR. At step 415, before N1/N2 transfer request, both UL session and UL voice flows can be over NR.

After an N2 rejection at step 420, the Wi-Fi session release is delayed for voice flows during PDU session establishment with NR. As such, SMF does not clean up Wi-Fi session resources towards UPF and ePDG. Also, SMF does not perform a query usage reporting rule (QueryURR) to UPF for fetching the usage report. In contrast to the conventional handover procedure, the handover procedure 400 in accordance with some aspects of the present disclosure does not include charging function update interaction with CHF for usage report for the Wi-Fi to NR handover as the session flow stays in NR (step 425). For example, there is no charging function update towards CHF for the handover from Wi-Fi to NR since the Wi-Fi session can be continued until a modify bearer request is received for the EPS fallback. Furthermore, since the time duration of the stay at NR is small, a consumption in NR can be negligible.

At step 430, as part of EPS fallback, SMF receives a session management (SM) context retrieval request from AMF. SMF includes a list of all EBS bearers related to the session and voice flows to transfer the resources. Also, AMF can transfer the received list of EPS bearers to MME as part of a "relocation request." As a result, all the assigned EPS bearers list as part of a handover from Wi-Fi to NR can seamlessly transfer to MME as part of EPS fallback, which can help further for MME/SGW to provide the list of EPS bearers to SMF+PGW-C to create session and voice flows EBI context in SMF+PGW-C by processing a GTPv2 modify bearer requirement message (MBReq).

Since the voice flows are migrated as part of a SM context retrieval response, SMF is not required to initiate GTPv2 create bearer request (CBReq or CBR) for dedicated bearer establishment for voice flows. As such, the latency for voice flows can be reduced by skipping at least two N4 interactions with UPF and one S5 interaction with SGW.

At step 435, procedure 400 includes installing DL session and voice flows for LTE. In some instances, once SMF processes the GTPv2 MBReq, SMF can clean up the Wi-Fi session resources. Also, Query URR towards UPF over the N4 interface can be performed. Here, the usage report is intimate for the handover from Wi-Fi to LTE only since the handover from Wi-Fi to NR is for a small time duration and therefore consumption of the handover is negligible. In some examples, SMF can send a charging update for the multi-usage report of Wi-Fi with PDU session information as LTE parameters towards CHF.

As follows, at step 440, the handover from Wi-Fi to LTE can be performed while a URR in the NR session can be dropped.

In contrast to the conventional handover procedure 300 as illustrated in FIG. 3, the handover procedure 400 does not include having UL voice flows over LTE before a create bearer request (step 445). The handover procedure 400 also does not include having DL voice flows over LTE after a create bearer response (step 450). At step 455, the handover procedure 400 is completed with a policy update from NR to LTE.

With this approach in accordance with procedure 400, latency glitch issues can be avoided since voice bearers on LTE are available prior to releasing the Wi-Fi session. Furthermore, resources can be saved across gNB, AMF, SMF, UPF, CHF side while UE behavior (e.g., communication or voice call) remains the same.

FIGS. 5A-5F illustrate example communication diagrams 500A, 500C, and 500E for a handover procedure of Wi-Fi to NR followed by EPS fallback according to one or more examples of the present disclosure.

Figure 5A:
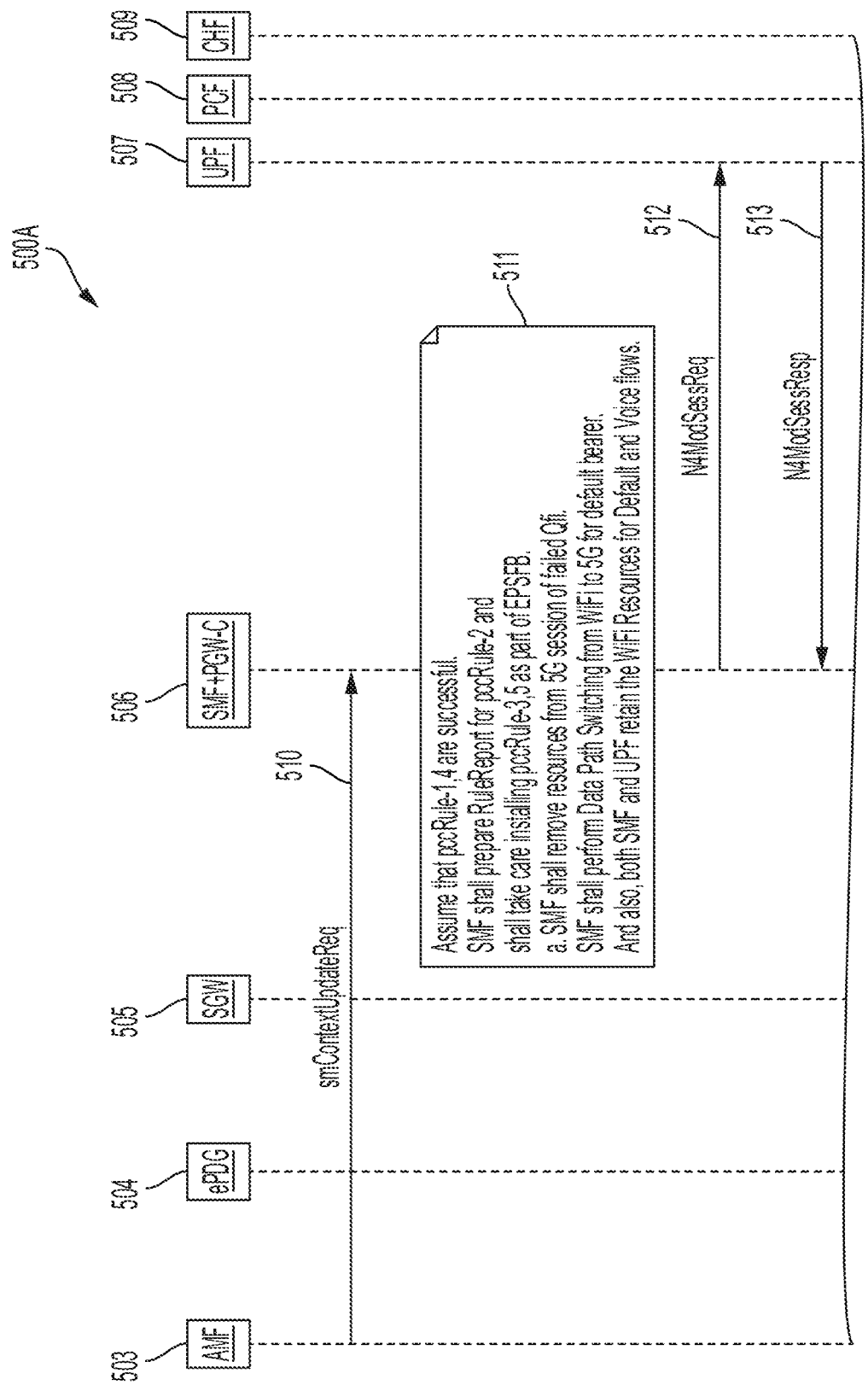
FIGS. 5A-5F illustrate an example communication diagram for a handover procedure of Wi-Fi to NR followed by EPS fallback according to one or more examples of the present disclosure.
Figure 5B:
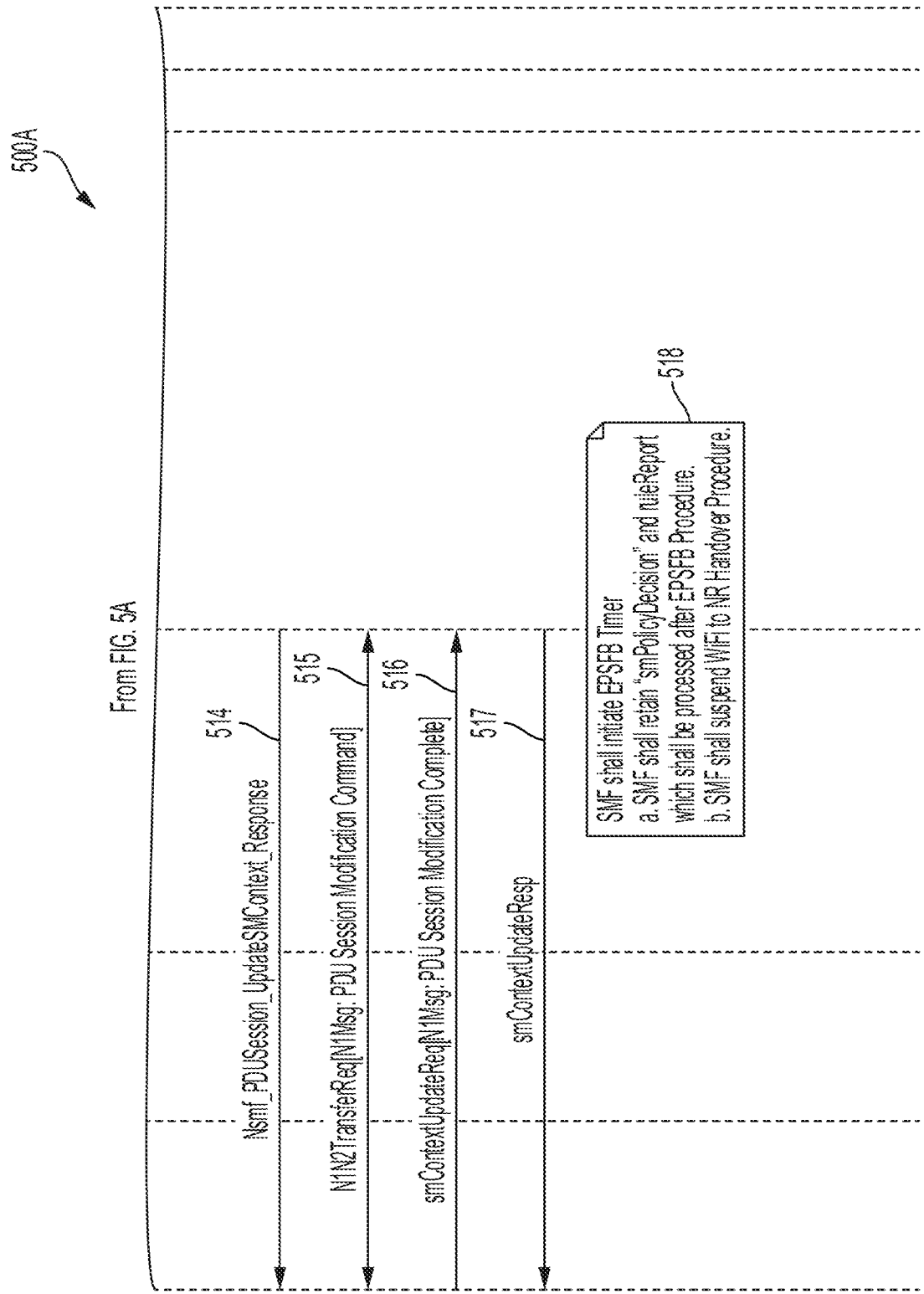

In some embodiments, as depicted in a communication diagram 500A in FIGS. 5A, and 5B, gNB enforces EPS fallback for a voice user at step 510. For example, at step 510, AMF 503 sends an SM context update request to SMF 506 with "PDU session resource setup response transfer" containing the failed Qfi list. Then, at step 511, SMF 506 removes resources from the 5G session of the failed Qfi and performs data path switching from Wi-Fi to 5G for the default bearer. Both SMF 506 and UPF 507 retain the Wi-Fi resources for default and voice flows.

In some instances, at step 512, SMF 506 sends an N4 session modification request to UPF 507 and does not perform query URR towards UPF 507. UPF 507 retains all Wi-Fi resources for default and voice flows. SMF 506 removes NR dedicated UL resources on UPF 507. UE 501 can continue to send traffic via Wi-Fi resources until UE 501 performs the 5G to 4G handover. At step 513, UPF 507 sends the N4 session modification response to SMF 506.

In some examples, at step 514, SMF 506 sends an NSMF PDU session update SM context response to AMF 503. NSMF refers to a service-based interface between AMF 503 and common service bus (e.g., PCF 508, Network Slice Selection Function (NSSF), Network Repository Function (NRF), Unified Data Management (UDM), or Application Function (AF)). At steps 515 and 516, SMF 506 receives the SM context update request with N1 message for PDU session modification completion from AMF 503. At step 517, SMF 506 sends the SM context update response to AMF 503.

At step 518, SMF 506 initiates an EPS fallback timer. For example, SMF 506 retains an SM policy decision and rule report, which can be processed after EPS fallback procedure. Also, SMF suspends the Wi-Fi to NR handover procedure.

Figure 5C:
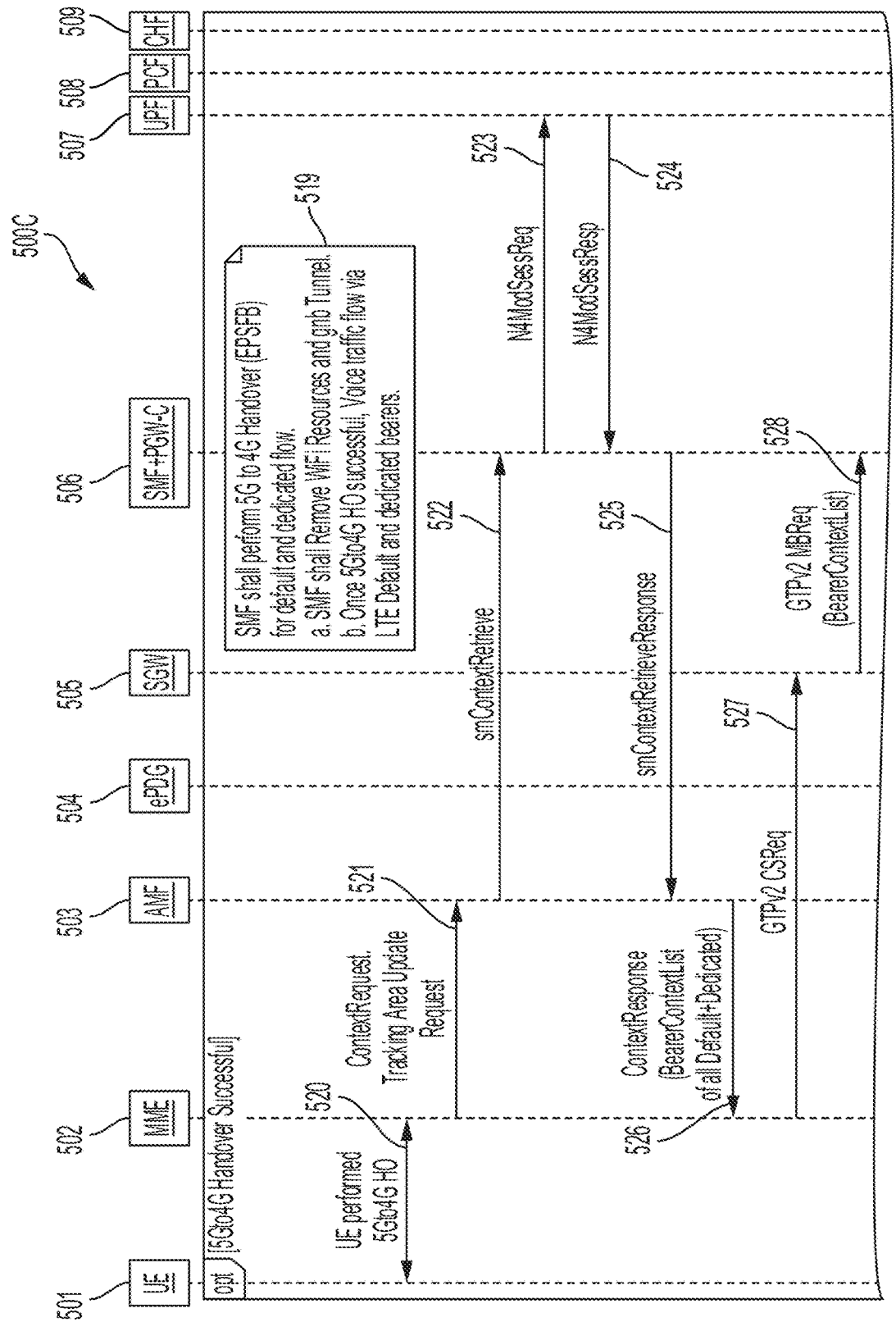
Figure 5D:
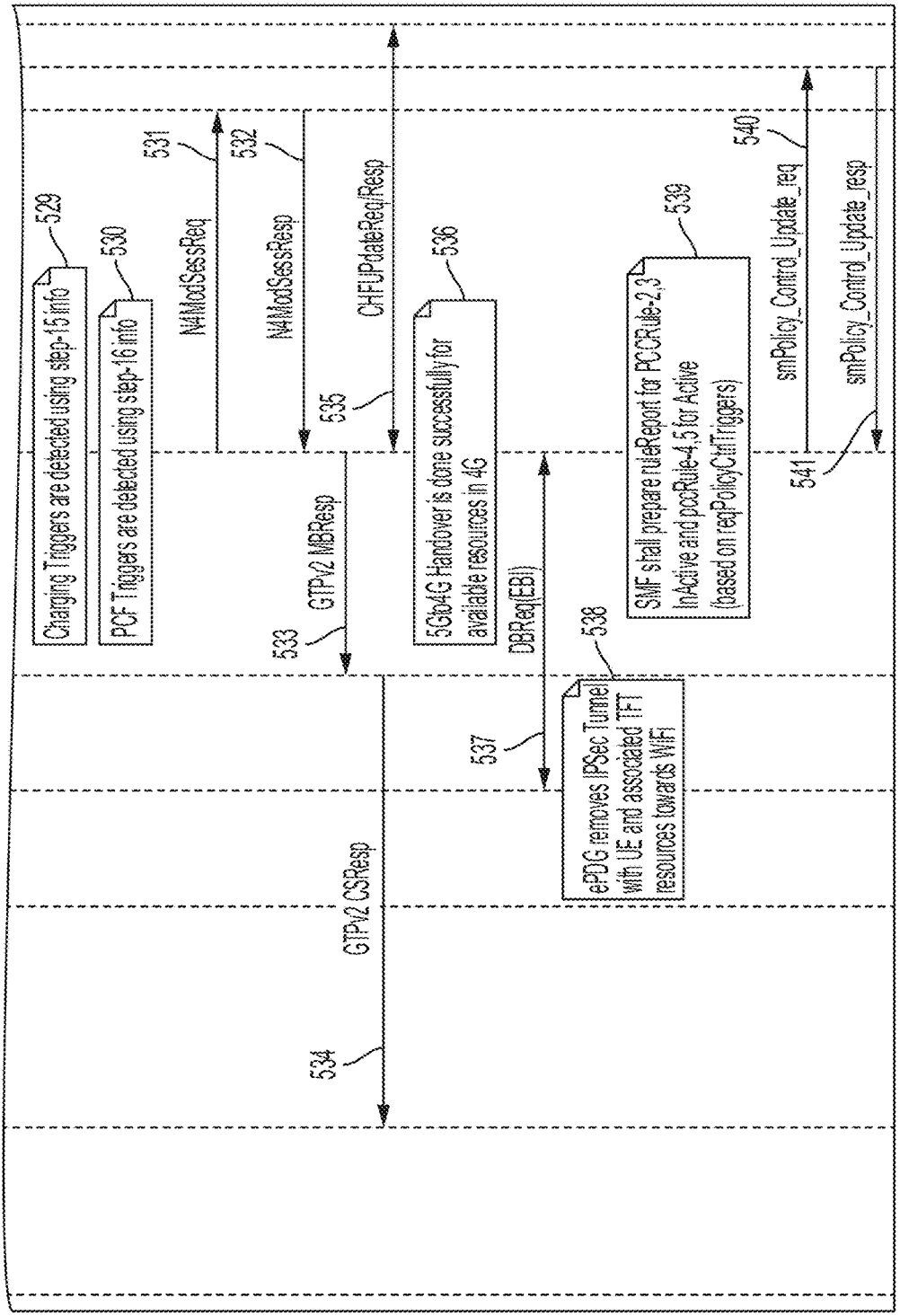

FIGS. 5C and 5D illustrate a communication diagram for a handover procedure 500C when 5G to 4G handover is successful. In some embodiments, SMF 506 performs 5G to 4G handover followed by EPS fallback for default and dedicated flow (step 519). As part of the handover procedure 500C, SMF 506 removes Wi-Fi resources and gNB tunnel. Once the 5G to 4G handover is successful, the voice traffic can flow via LTE default and dedicated bearers. For example, at step 520, UE 501 performs the 5G to 4G handover procedure. MME 502 then sends a context request and tracking area update request to AMF 503 at step 521.

In some examples, at step 525, as part of EPS fallback, SMF 506 receives the SM context retrieval response from AMF 503. For example, SMF 506 includes all EBI lists related to session and voice flows to transfer the resources in the SM context retrieval response to AMF 503. SMF 506 can take care of transferring the EBIs, which are allocated by AMF 503 as part of Wi-Fi to NR, which then communicated to UE during PDU session establishment procedure in NAS messages. Since the voice flows are migrated as part of the SM context retrieval response, SMF is not required to initiate a GTPv2 create bearer request for dedicated bearer establishment for voice flows. As such, the latency for voice flows can be reduced by saving two N4 interactions with UPF 507 and one S5 interaction with SGW 505.

At step 526, AMF 502 transfers the received EBI list transparently to MME 502. At step 527, MME 502 can send the GTPv2 create bearer request to SGW 505. At step 528, SGW 505 then sends the GTPv2 modify bearer requirement message to SMF 506.

In some embodiments, charging triggers can be detected based on information regarding a list of EPS bearer identifiers (e.g., EBI list) at step 529. Also, PCF 508 triggers can be detected based on information regarding the N1/N2 transfer request at step 530. At step 531 and step 532, SMF 506 and UPF 507 exchange an N4 session modification request and response. At step 533, upon receiving the N4 session modification response from UPF 507, SMF 506 sends the GTPv2 modify bearer requirement message to SGW 505. Then, at step 534, SGW 505 sends a GTPv2 create session response message to MME 502. At step 536, it is determined that the handover from 5G to 4G is done successfully for available resources in 4G.

In some examples, a delete session request for the EBI list is exchanged between ePDG 504 and SMF 506 at step 537. Then, at step 538, ePDG 504 removes IPSec tunnel with UE 501 and associated TFT resources towards Wi-Fi. Also, at step 539, SMF 506 prepares a usage rule report. At step 540, SMF 506 sends the SM policy control update request to PCF 508. At step 541, PCF 508 sends the SM policy decision as SM policy control update response to SMF 506.

Figure 5E:
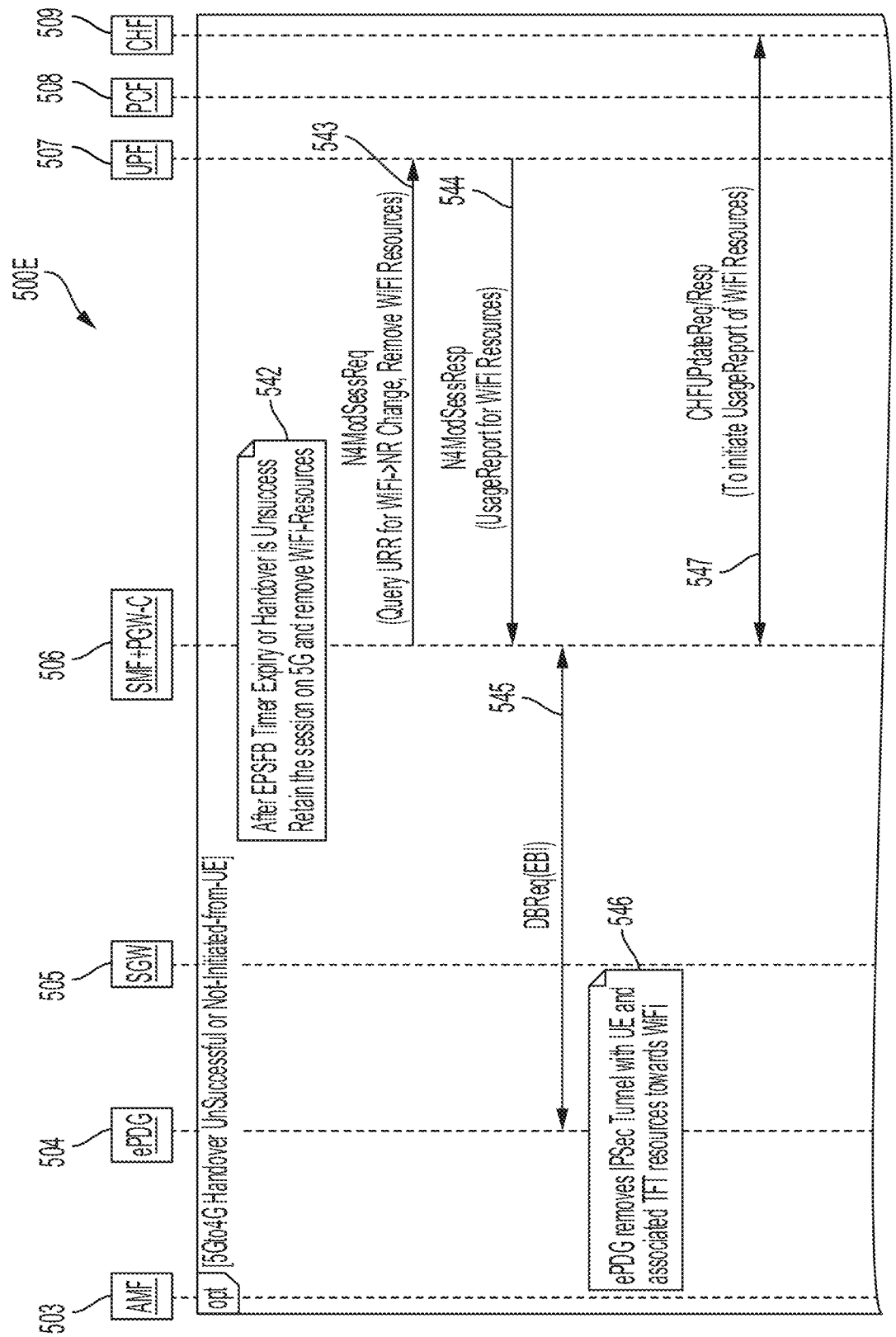
Figure 5F:
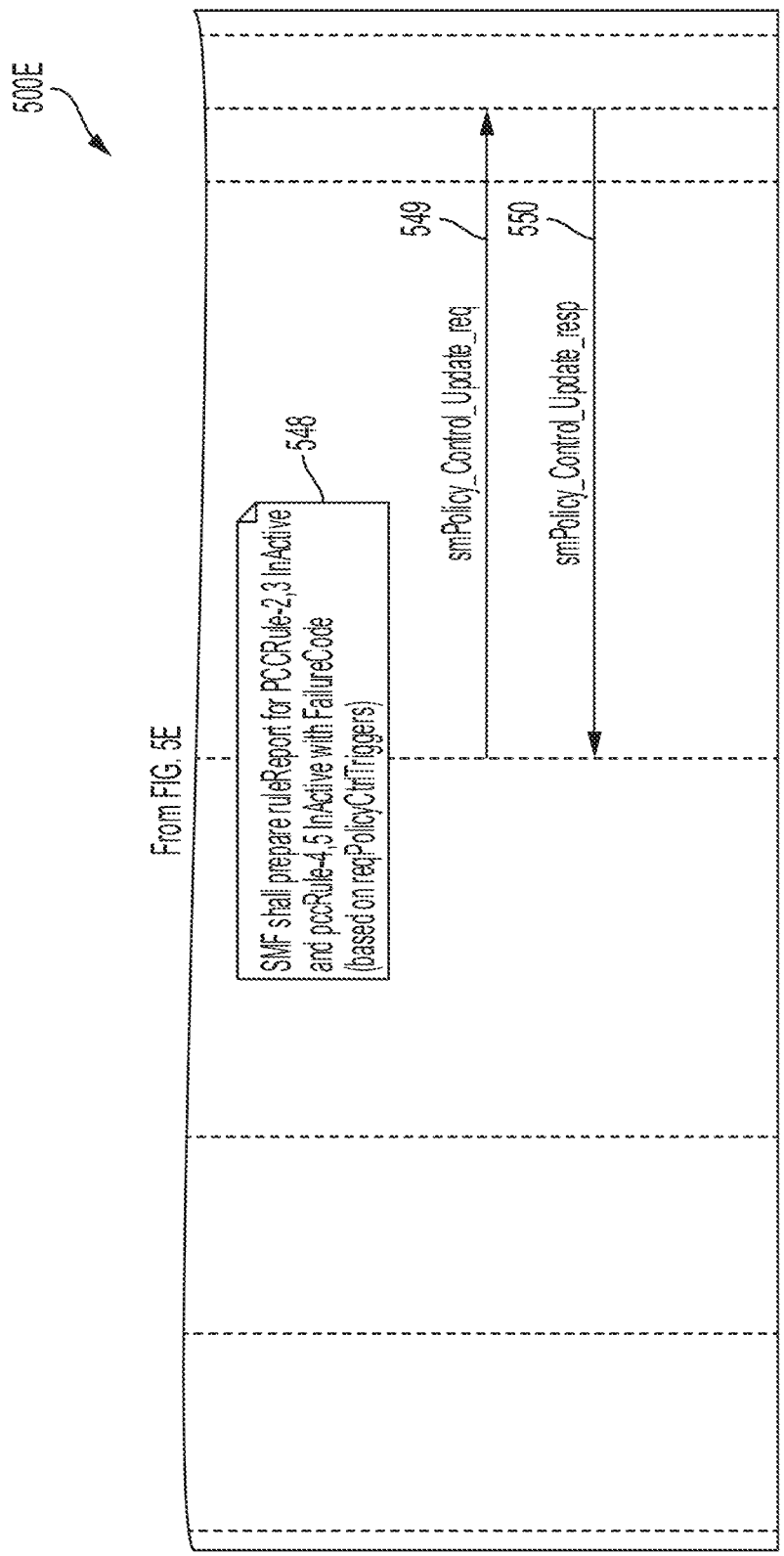

FIGS. 5E and 5F illustrate a communication diagram for a handover procedure 500E when 5G to 4G handover is unsuccessful or not initiated from UE. In some embodiments, after the EPS fallback timer expires or when the 5G to 4G handover is unsuccessful, the session on 5G can be retained and Wi-Fi resources can be removed at step 542. In some examples, at step 543, SMF 506 sends N4 modification session request towards UPF 507 where query URR for Wi-Fi to NR change is performed and Wi-Fi resources are removed. In response, UPF 507 sends N4 modification session response to SMF 506 with usage report for Wi-Fi resources (step 544). At step 545, a delete session request for the EBI list is exchanged between ePDG 504 and SMF 506. In some examples, at step 546, ePDG 504 removes IPSec tunnel with UE 501 and associated TFT resources towards Wi-Fi.

At step 547, a CHF 509 update request and response can be exchanged between SMF 506 and UPF 507 to initiate a usage report of Wi-Fi resources. Then, SMF 506 prepares the rule report at step 548. At step 549, SMF 506 sends the SM policy control update request to PCF 508. At step 550, PCF 508 sends the SM policy decision as an SM policy control update response to SMF 506.

Figure 6:
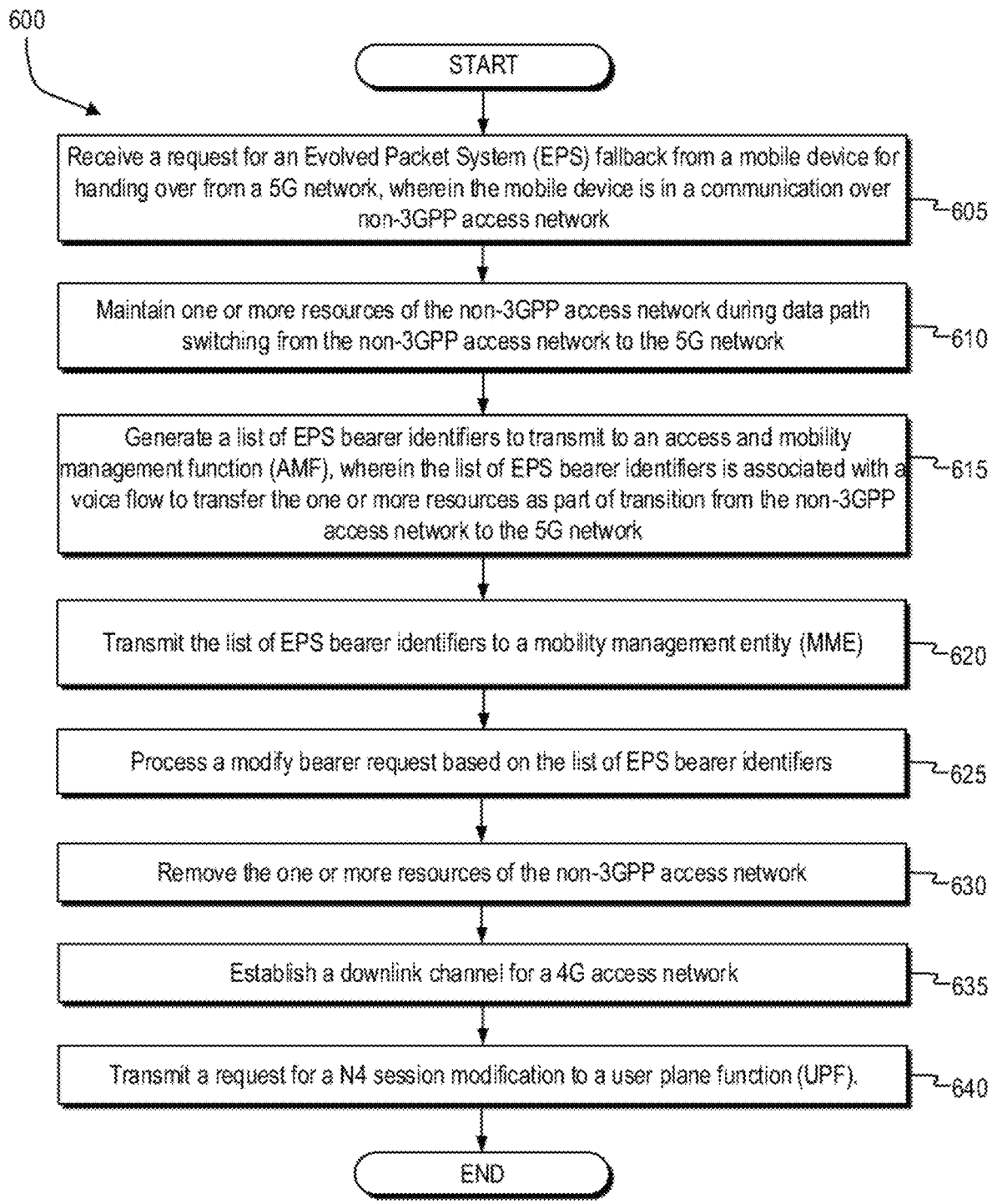
FIG. 6 illustrates a flowchart of a method for a handover procedure of Wi-Fi to NR followed by EPS fallback according to one or more examples of the present disclosure.

FIG. 6 illustrates a flowchart of a method 600 for Wi-Fi to NR followed by EPS fallback handover according to one or more examples of the present disclosure.

Although example method 600 depicts a particular sequence of operations, the sequence may be altered without departing from the scope of the present disclosure. For example, some of the operations depicted may be performed in parallel or in a different sequence that does not materially affect the function of method 600. In other examples, different components of an example device or system that implements the method 600 may perform functions at substantially the same time or in a specific sequence.

In some embodiments, the method includes receiving a request for an EPS fallback from a mobile device for a handover to a 5G network, wherein the mobile device is in communication over a non-3GPP access network at step 605. For example, while a UE (e.g., UE 501 in FIGS. 5C and 5D) is in communication over the non-3GPP access network (e.g., Wi-Fi) and moves to 3GPP access network (e.g., NR), method 600 includes receiving a request for an EPS fallback from UE (e.g., UE 501 in FIGS. 5C and 5D) for a handover to a 5G network.

In some examples, the method includes maintaining one or more resources of the non-3GPP access network during data path switching from the non-3GPP access network to the 5G network at step 610.

In some instances, the method includes, in a response to an initial setup message for the EPS fallback, generating a list of EPS bearer identifiers to transmit to an AMF at step 615. The list of EPS bearer identifiers is associated with a voice flow to transfer the one or more resources of the non-3GPP access network as part of the handover from the non-3GPP access network to the 5G network. For example, a list of EPS bearer identifiers can be generated to transmit to AMF 503 as depicted in FIGS. 5A-5F.

According to some embodiments, the list of EPS bearer identifiers can be transmitted to an MME at step 620. In particular, the list of EPS bearer identifiers can be transmitted to the MME as part of a forward relocation request. For example, the list of EPS bearer identifiers can be transmitted to MME 502 as illustrated in FIGS. 5C and 5D.

In some examples, a voice flow can be maintained through a default bearer and a dedicated bearer of the non-4GPP access network (e.g., Wi-Fi) for uplink and downlink traffic until a modify bearer request is processed. For example, UE 501 in FIGS. 5C and 5D can continue the communication over the non-3GPP access network (e.g., Wi-Fi) until the modify bearer request is processed.

In some instances, the method includes processing the modify bearer request based on the list of EPS bearer identifiers at step 625. For example, the modify bearer request can be processed based on the list of EPS bearer identifiers, which was generated at step 615.

In some examples, the method includes removing the one or more resources of the non-3GPP access network at step 630 and establishing a downlink channel for a 4G access network at step 635.

In some embodiments, the method includes transmitting a request for an N4 session modification to a UPF at step 640. For example, a request for an N4 session modification can be transmitted to UPF 507 as illustrated in FIGS. 5A-5F.

Figure 7:
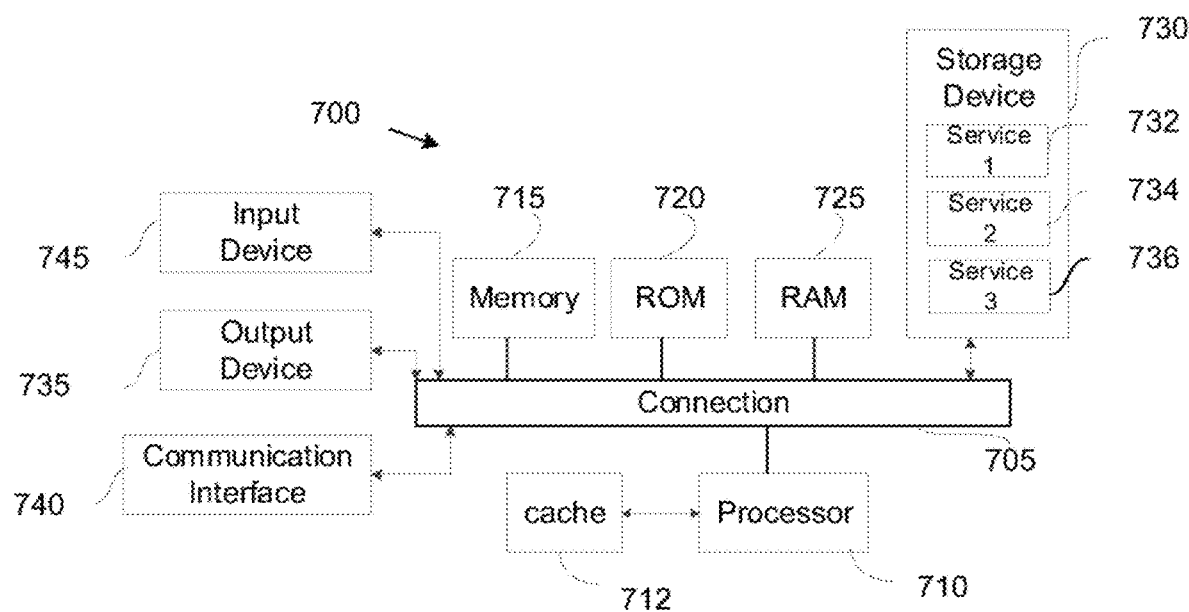
FIG. 7 shows an example computing system, which can be for example any computing device that can implement components of the system.

FIG. 7 illustrates an example computing system 700 including components in electrical communication with each other using a connection 705 upon which one or more aspects of the present disclosure can be implemented. Connection 705 can be a physical connection via a bus, or a direct connection into processor 710, such as in a chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

Figure 8:
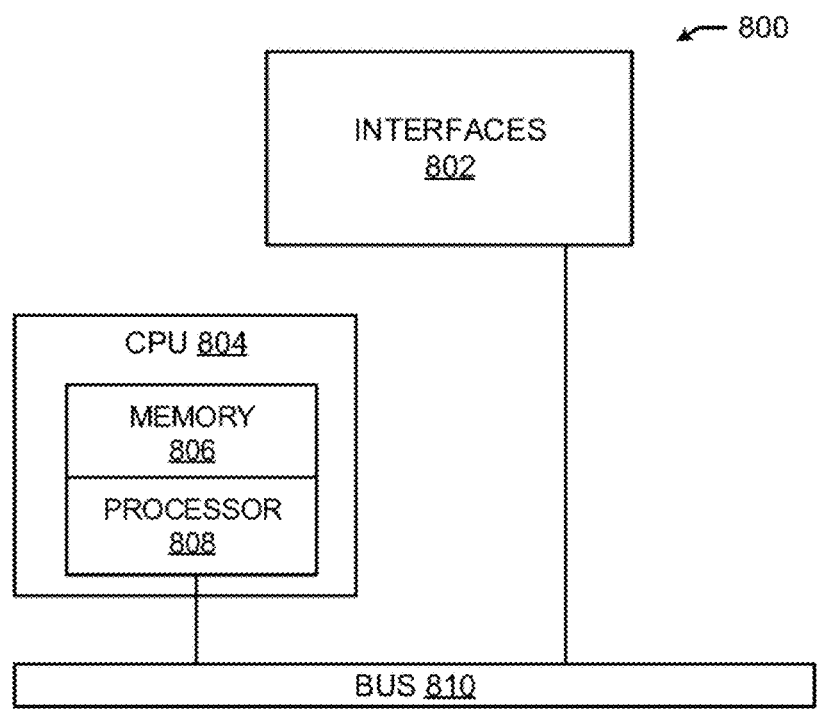
FIG. 8 illustrates an example network device.

FIG. 8 illustrates an example network device 800 suitable for performing switching, routing, load balancing, and other networking operations. Network device 800 includes a central processing unit (CPU) 804, interfaces 802, and a bus 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 804 to efficiently perform routing computations, network diagnostics, security functions, etc.

Although the system shown in FIG. 8 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the bus 810, to exchange data and signals and coordinate various types of operations by the network device 800, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
receiving a request for an Evolved Packet System (EPS) fallback to a 4G access network from a mobile device for a handover to a 5G network, wherein the mobile device is in communication over non-3GPP access network;
maintaining one or more resources used for a voice flow through a bearer of the non-3GPP access network during data path switching from the non-3GPP access network to the 5G network;
removing, by a Session Management (SM) Function (SMF), the one or more resources of the non-3GPP access network subsequent to processing of a request to modify the bearer of the non-3GPP access network;
establishing a downlink channel for the 4G access network; and
transmitting a request for an N4 session modification to a user plane function (UPF).

2. The method of claim 1, wherein a list of EPS bearer identifiers is transmitted to a mobility management entity (MME) as part of a forward relocation request.

3. The method of claim 1, further comprising:
maintaining a voice flow through a default bearer and a dedicated bearer of the non-3GPP access network for uplink and downlink traffic until the modify bearer request is processed.

4. The method of claim 1, further comprising:
processing the modify bearer request based on a list of EPS bearer identifiers.

5. The method of claim 1, further comprising:
continuing the communication over the non-3GPP access network until the modify bearer request is processed.

6. The method of claim 1, further comprising:
generating a list of EPS bearer identifiers at the SMF in a SM context retrieval response, the list of EPS bearer identifiers transmitted to an access and mobility management function (AMF), wherein the list of EPS bearer identifiers is associated with a voice flow to transfer the one or more resources of the non-3GPP access network as part of the handover from the non-3GPP access network to the 5G network; and transmitting the list of EPS bearer identifiers to a mobility management entity (MME) rather than initiating a create bearer request based on having transferred the voice flow as part of the SM context retrieval response, wherein the EPS bearer identifiers are transferred to the MME as part of the EPS fallback.

7. The method of claim 1, further comprising:
sending a charging update request to a charging function, the charging update request including a Protocol Data Unit (PDU) session information with one or more access parameters associated with the 4G access network and a multi-usage report containing details on one or more access parameters associated with the non-3GPP access network.

8. A system comprising:
a storage configured to store instructions;
a processor configured to execute the instructions and cause the processor to:
receive a request for an Evolved Packet System (EPS) fallback to a 4G access network from a mobile device for a handover to a 5G network, wherein the mobile device is in communication over non-3GPP access network;
maintain one or more resources used for a voice flow through a bearer of the non-3GPP access network during data path switching from the non-3GPP access network to the 5G network;
remove, by a Session Management (SM) Function (SMF), the one or more resources of the non-3GPP access network subsequent to processing of a request to modify the bearer of the non-3GPP access network;
establish a downlink channel for the 4G access network; and
transmit a request for an N4 session modification to a user plane function (UPF).

9. The system of claim 8, wherein a list of EPS bearer identifiers is transmitted to an MME as part of a forward relocation request.

10. The system of claim 8, wherein the processor is configured to execute the instructions and cause the processor to:
maintain a voice flow through a default bearer and a dedicated bearer of the non-3GPP access network for uplink and downlink traffic until the modify bearer request is processed.

11. The system of claim 8, wherein the processor is configured to execute the instructions and cause the processor to:
process the modify bearer request based on a list of EPS bearer identifiers.

12. The system of claim 8, wherein the processor is configured to execute the instructions and cause the processor to:
continue the communication over the non-3GPP access network until the modify bearer request is processed.

13. The system of claim 8, wherein the processor is configured to execute the instructions and cause the processor to:
generate a list of EPS bearer identifiers at a SMF in a SM context retrieval response, the list of EPS bearer identifiers transmitted to an AMF, wherein the list of EPS bearer identifiers is associated with a voice flow to transfer the one or more resources of the non-3GPP access network as part of the handover from the non-3GPP access network to the 5G network; and
transmit the list of EPS bearer identifiers to an MME rather than initiating a create bearer request based on having transferred the voice flow as part of the SM context retrieval response, wherein the EPS bearer identifiers are transferred to the MME as part of the EPS fallback.

14. The system of claim 8, wherein the processor is configured to execute the instructions and cause the processor to:
send a charging update request to a charge function, the charging update request including a PDU session information with one or more access parameters associated with the 4G access network and a multi-usage report containing details on one or more access parameters associated with the non-3GPP access network.

15. A non-transitory computer readable medium comprising instructions, which when executed by a computing system, cause the computing system to:
receive a request for an EPS fallback to a 4G access network from a mobile device for a handover to a 5G network, wherein the mobile device is in communication over non-3GPP access network;
maintain one or more resources used for a voice flow through a bearer of the non-3GPP access network during data path switching from the non-3GPP access network to the 5G network;
remove, by an SMF, the one or more resources of the non-3GPP access network subsequent to processing of a request to modify the bearer of the non-3GPP access network;
establish a downlink channel for the 4G access network; and
transmit a request for an N4 session modification to a user plane function (UPF).

16. The non-transitory computer readable medium of claim 15, wherein a list of EPS bearer identifiers is transmitted to an MME as part of a forward relocation request.

17. The non-transitory computer readable medium of claim 15, wherein the non-transitory computer readable medium further comprises instructions that, when executed by the computing system, cause the computing system to:
maintain a voice flow through a default bearer and a dedicated bearer of the non-3GPP access network for uplink and downlink traffic until the modify bearer request is processed.

18. The non-transitory computer readable medium of claim 15, wherein the non-transitory computer readable medium further comprises instructions that, when executed by the computing system, cause the computing system to:
process the modify bearer request based on a list of EPS bearer identifiers.

19. The non-transitory computer readable medium of claim 15, wherein the non-transitory computer readable medium further comprises instructions that, when executed by the computing system, cause the computing system to:
continue the communication over the non-3GPP access network until the modify bearer request is processed.

20. The non-transitory computer readable medium of claim 15, wherein the non-transitory computer readable medium further comprises instructions that, when executed by the computing system, cause the computing system to:
generate a list of EPS bearer identifiers at a SMF in a SM context retrieval response, the list of EPS bearer identifiers transmitted to an AME, wherein the list of EPS bearer identifiers is associated with a voice flow to transfer the one or more resources of the non-3GPP access network as part of the handover from the non-3GPP access network to the 5G network; and transmit the list of EPS bearer identifiers to an MME rather than initiating a create bearer request based on having transferred the voice flow as part of the SM context retrieval response, wherein the EPS bearer identifiers are transferred to the MME as part of the EPS fallback.

* * * * *